United States Patent
Xiang et al.

(10) Patent No.: US 9,641,110 B2
(45) Date of Patent: May 2, 2017

(54) POWER CONTROLLER FOR SUPERCAPACITOR

(71) Applicant: Nanjing Super Science & Technology Industrial Co., Ltd., Nanjing (CN)

(72) Inventors: Kewei Xiang, Nanjing (CN); Qicong Ge, Nanjing (CN)

(73) Assignee: NANJING SUPER SCIENCE & TECHNOLOGY INDUSTRIAL CO., LTD., Nanjing (CN)

( * ) Notice: Subject to any disclaimer, the term of this patent is extended or adjusted under 35 U.S.C. 154(b) by 0 days.

(21) Appl. No.: 14/792,604

(22) Filed: Jul. 6, 2015

(65) Prior Publication Data

US 2015/0311840 A1 Oct. 29, 2015

Related U.S. Application Data

(63) Continuation-in-part of application No. PCT/CN2014/000591, filed on Jun. 17, 2014.

(30) Foreign Application Priority Data

Mar. 27, 2014 (CN) .......................... 2014 1 0118400

(51) Int. Cl.
| | | |
|---|---|---|
| G05B 11/28 | (2006.01) | |
| H02P 7/06 | (2006.01) | |
| H02M 3/156 | (2006.01) | |
| H02J 7/00 | (2006.01) | |
| H02J 15/00 | (2006.01) | |

(52) U.S. Cl.
CPC .................. *H02P 7/06* (2013.01); *H02J 7/00* (2013.01); *H02J 15/00* (2013.01); *H02M 3/156* (2013.01)

(58) Field of Classification Search
CPC ................................ H02J 7/345; Y02E 60/13
USPC .......................... 320/117, 166; 318/599, 811
See application file for complete search history.

(56) References Cited

U.S. PATENT DOCUMENTS

| | | | |
|---|---|---|---|
| 5,051,613 A * | 9/1991 | Houser, Jr. ........... | H03K 17/687 327/544 |
| 5,260,637 A * | 11/1993 | Pizzi ..................... | B60L 11/005 320/103 |
| 5,373,195 A * | 12/1994 | De Doncker ......... | B60L 11/005 307/45 |

(Continued)

*Primary Examiner* — Rina Duda
(74) *Attorney, Agent, or Firm* — Matthias Scholl P.C.; Matthias Scholl

(57) ABSTRACT

A power controller, including a supercapacitor, a motor, a transistor switch, an electric signal processor, an output resistor, a sampling resistor, a filter capacitor, a voltage-stabilizing circuit, a flyback diode, and a switch. The supercapacitor is connected in parallel to the motor, the transistor switch, and the sampling resistor to form a main working circuit. The signal output end of the electric signal processor is connected to a trigger electrode of the transistor switch via the output resistor. The sampling end of the electric signal processor is connected to the sampling resistor. The motor is connected in parallel to the flyback diode. The sampling resistor is connected in parallel to the filter capacitor. The Vcc end of the electric signal processor is connected to the supercapacitor via the voltage-stabilizing circuit. The state control ends of the electric signal processor are connected to the GND or Vcc of the electric signal processor via the switch.

4 Claims, 1 Drawing Sheet

(56) References Cited

U.S. PATENT DOCUMENTS

| | | | | |
|---|---|---|---|---|
| 5,723,956 A * | 3/1998 | King | ................. | B60L 11/005 307/44 |
| 6,650,091 B1 * | 11/2003 | Shiue | ................. | B25B 21/00 320/166 |
| 6,753,673 B2 * | 6/2004 | Shiue | ................. | H03K 3/53 320/117 |
| 7,541,692 B2 * | 6/2009 | Hirst | ................. | G06F 1/266 307/44 |
| 7,800,244 B2 * | 9/2010 | Treguer | ............... | H02J 7/1423 307/10.1 |
| 2008/0310195 A1 * | 12/2008 | Seberger | ............... | H02M 3/158 363/26 |
| 2012/0265230 A1 * | 10/2012 | Yates | ............... | A61B 17/07207 606/170 |

* cited by examiner

POWER CONTROLLER FOR SUPERCAPACITOR

CROSS-REFERENCE TO RELATED APPLICATIONS

This application is a continuation-in-part of International Patent Application No. PCT/CN2014/000591 with an international filing date of Jun. 17, 2014, designating the United States, now pending, and further claims priority benefits to Chinese Patent Application No. 201410118400.2 filed Mar. 27, 2014. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to a power controller for supercapacitors.

Description of the Related Art

Supercapacitors contain a large number of charges and thus can be used as a power supply for small power motors for short-time operation. However, compared with chemical cells, supercapacitors have relatively low volume and capacity, as well as the following disadvantages: 1. the terminal voltage change rate of chemical cells is often less than 15%, while that of a supercapacitor often reaches 80-90% of the rated value; 2. the initial voltage of a supercapacitor cannot be too high, or the motor will malfunction; and 3. the working conditions of the motor, such as rotational speed and power output, cannot be regulated.

SUMMARY OF THE INVENTION

In view of the above-described problems, it is one objective of the invention to provide a power controller for supercapacitors which enables a motor equipped therewith to work smoothly and steadily, under adjustable working conditions.

To achieve the above objective, in accordance with one embodiment of the invention, there is provided a power controller for supercapacitors comprising a supercapacitor, a motor, a transistor switch, an electric signal processor, an output resistor, a sampling resistor, a filter capacitor, a voltage-stabilizing circuit, a flyback diode, and a switch. The supercapacitor, the motor, the transistor switch and the sampling resistor are serially connected to form a main working circuit; a signal output end of the electric signal processor is connected to a trigger electrode of the transistor switch via the output resistor; a sampling end of the electric signal processor is connected to the sampling resistor; the motor is connected in parallel to the flyback diode; the sampling resistor is connected in parallel to the filter capacitor; a Vcc end of the electric signal processor is connected to the supercapacitor via the voltage-stabilizing circuit; and state control ends of the electric signal processor are connected to a GND or Vcc of the electric signal processor via the switch.

In a class of this embodiment, the supercapacitor, the motor, and the transistor switch are serially connected to form the main working circuit; and the sampling resistor of the electric signal processor is connected to a positive pole of the supercapacitor.

In a class of this embodiment, the state control ends of the electric signal processor are adjustable in number.

Advantages of the power controller for supercapacitors according to embodiments of the invention are summarized as follows. The motor is connected in parallel to the flyback diode, and the Vcc end of the electric signal processor is connected to the supercapacitor via the voltage-stabilizing circuit, so that the motor can work smoothly and steadily under adjustable working conditions, and the supercapacitor can output more energy. In addition, the state control ends of the electric signal processor are connected to a GND or Vcc of the electric signal processor via the switch, so the number thereof can increase or decrease.

Take a small power motor as an example. The motor has a rated voltage of 3.6 V and is adapted to direct charging and direct discharging. Two supercapacitors are serially connected with each having a withstand voltage of 2.7 V and capacitance of 180 F, so the total capacitance is 180 F×2=360 F. Upon charging, the maximum charging voltage of each capacitor is 2.3 V, so the total charging voltage of the two serially-connected capacitors is 4.6 V. The more high voltage will burn the motor. During working, the voltage of the supercapacitor decreases gradually from 4.6 V to 3 V until the motor stops working. In the initial stage of the working, the motor works under excess voltage, the rotational speed is fast, which will affect the service life of the motor, and with the rotational speed decreasing, the working becomes unsteadily. In such conditions, the discharged energy of the supercapacitor is: $P_1=0.5 \times C \times U^2=0.5 \times (180 \div 2) \times (4.6^2-3^2)=547.2$ J. If the motor is combined with the power controller of invention, and three supercapacitors are serially connected with each having a capacitance of 120 F, the total capacitance is 120 F×3=360 F. Upon charging, the maximum charging voltage of each capacitor is 2.7 V, so the total charging voltage of the three serially-connected capacitors is 8.1 V. In such conditions, the discharged energy of the supercapacitor is: $P_1=0.5 \times C \times U^2=0.5 \times (120 \div 3) \times (8.1^2-3^2)=1132.2$ J. Take the voltage-stabilizing loss into account, about 5%, the actual discharged energy of the supercapacitor is: 1132.2×0.95=1075.6 J. The energy ratio of the supercapacitors of the two modes is: 1075.6÷547.2=1.97. In addition, the power controller can ensure the motor works in rated conditions most of the time, thereby preventing the excess voltage, and the switch K can also alter the working conditions of the motor.

Figure 1:
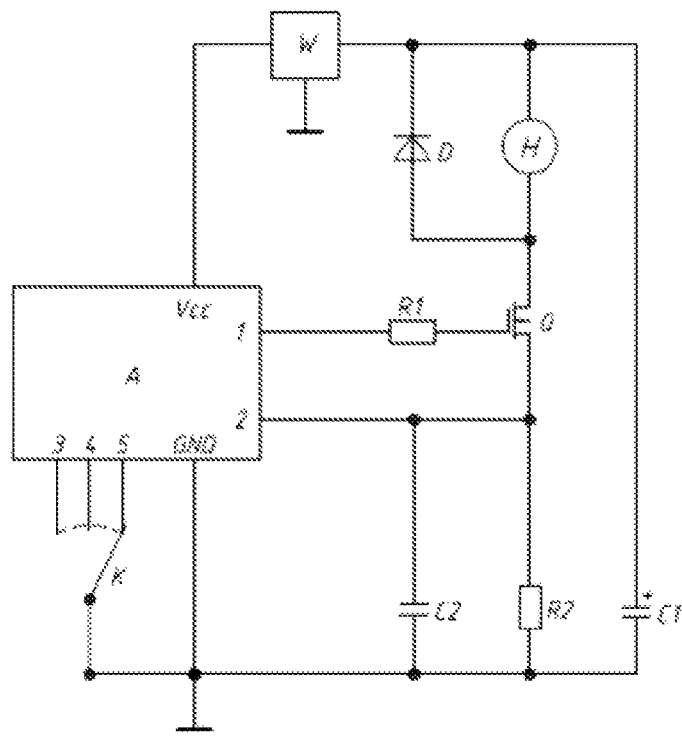
FIG. 1 is an electrical schematic diagram of a current sampling in accordance with one embodiment of the invention.

In the drawings, the following reference numbers are used: C1. Supercapacitor; C2. Filter capacitor; R1. Output resistor; R2. Sampling resistor; H. Motor; Q. Transistor switch; A. Electric signal processor; W. Voltage-stabilizing circuit; D. Flyback diode; K. Switch.

DETAILED DESCRIPTION OF THE EMBODIMENTS

For further illustrating the invention, experiments detailing a power controller for supercapacitors are described below. It should be noted that the following examples are intended to describe and not to limit the invention.

As shown in FIG. 1, a power controller for supercapacitors comprises a supercapacitor C1, a motor H, a transistor switch Q, an electric signal processor A, an output resistor R1, a sampling resistor R2, a filter capacitor C2, a voltage-stabilizing circuit W, a flyback diode D, and a switch K. The supercapacitor C1 is connected in parallel to the motor H, the transistor switch Q, and the sampling resistor R2 and the motor H, the transistor Q, and the sampling resistor R2 are serially connected. A signal output end 1 of the electric signal processor A is connected to a trigger electrode of the transistor switch Q via the output resistor R1; a sampling end 2 of the electric signal processor A is connected to the sampling resistor R2; the motor H is connected in parallel to the flyback diode D; the sampling resistor R2 is connected in parallel to the filter capacitor C2; a Vcc end of the electric signal processor A is connected to the supercapacitor C1 via the voltage-stabilizing circuit W; and state control ends 3, 4, 5 of the electric signal processor A are connected to a GND or Vcc of the electric signal processor via the switch K.

During working, the transistor switch Q is turned on, and the supercapacitor C1 discharges via the motor H, the transistor switch Q, and the sampling resistor R2. When the transistor switch Q is turned off, the circuit disconnects, and the supercapacitor C1 stops discharging. The trigger electrode of the transistor switch Q is controlled by the signal output end 1 of the electric signal processor A. The signal output end 1 of the electric signal processor A outputs square wave with adjustable duty ratio. The larger the duty ratio of the square wave, the longer the discharging time of the supercapacitor C1; the smaller the duty ratio of the square wave, the shorter the discharging time of the supercapacitor C1. As a result, the output power of the supercapacitor C1 is adjustable. Because the supercapacitor C1 is connected to the motor H in parallel, the power of the motor H is also adjustable. The sampling end 2 of the electric signal processor A is connected to the sampling resistor R2, when the output current of the supercapacitor C1 is relatively large, the voltage of the sampling resistor R2 increases accordingly. Through the feedback of the feedback circuit in the electric signal processor A, the duty ratio of the signal output end 1 is decreased, so that the output current of the supercapacitor C1 returns to a normal level, vice versa. For an inductive load motor, it is practicable to change the output frequency to adjust the current. By controlling the switch K to connect to the state control end 3, 4, or 5 of the electric signal processor A, the feedback circuit in the electric signal processor A can be selected, thereby controlling the working conditions of the motor, such as rotational speed, power and intermission working mode. The state control ends of the electric signal processor are adjustable in number. In this example, the number is three. The other end of the switch K is connected to a GND or Vcc of the electric signal processor via the switch. In this example, the switch K is connected to GND. The voltage-stabilizing circuit is configured to supply stable working voltage and reference voltage for the electric signal processor A, independent of the voltage alteration of the supercapacitor C1. The voltage-stabilizing circuit is a three-terminal voltage regulator or zener diode. The filter capacitor C2 can filter out signal fluctuation of the sampling resistor R2 thereby ensuring the sampling signal is smooth, steady, and accurate. The flyback diode D is configured to protect electronic components and feedback the energy. When the transistor switch Q is turned off, high self-induced voltage will be generated. The flyback diode D can absorb the energy and feedback it to the circuit. The electric signal processor A can be selected from CPU, operational amplifier, digital integrated circuit, etc. The transistor switch can be a field-effect transistor.

Figure 2:
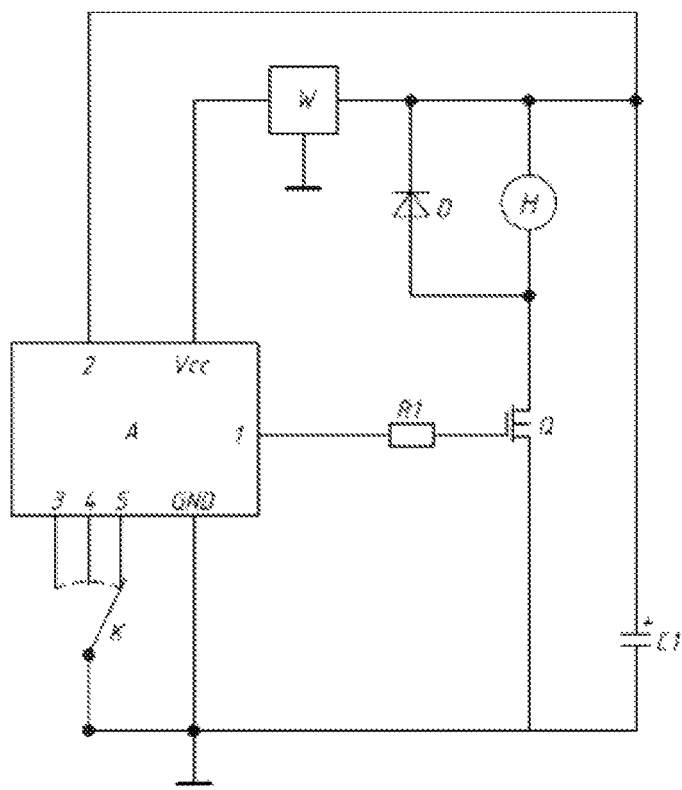
FIG. 2 is an electrical schematic diagram of a voltage sampling in accordance with one embodiment of the invention.

As shown in FIG. 2, the supercapacitor C1 is connected in parallel to the motor H and the transistor switch Q and the motor H and the transistor switch Q are serially connected, and the sampling end 2 of the electric signal processor A is connected to a positive pole of the supercapacitor C1. In working, when the voltage of the supercapacitor C1 decreases gradually, so does the voltage of the sampling end 2. Through the feedback of the feedback circuit in the electric signal processor A, the duty ratio or frequency of the signal output end 1 is adjusted, so that the output current of the supercapacitor C1 returns to a normal level.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:
1. A power controller, comprising:
   a) a supercapacitor;
   b) a motor;
   c) a transistor switch;
   d) an electric signal processor;
   e) an output resistor;
   f) a sampling resistor;
   g) a filter capacitor;
   h) a voltage-stabilizing circuit;
   i) a flyback diode; and
   j) a switch;
wherein
   the supercapacitor is connected in parallel to the motor, the transistor switch, and the sampling resistor and the motor, the transistor switch, and the sampling resistor are connected in series;
   a signal output end of the electric signal processor is connected to a trigger electrode of the transistor switch via the output resistor;
   a sampling end of the electric signal processor is connected to the sampling resistor;
   the motor is connected in parallel to the flyback diode;
   the sampling resistor is connected in parallel to the filter capacitor;
   a Vcc end of the electric signal processor is connected to the supercapacitor via the voltage-stabilizing circuit; and
   state control ends of the electric signal processor are connected to a GND or Vcc of the electric signal processor via the switch.

2. The power controller of claim 1, wherein the state control ends of the electric signal processor are adjustable in number.

3. A power controller, comprising:
   a) a supercapacitor;
   b) a motor;
   c) a transistor switch;
   d) an electric signal processor;
   e) an output resistor;
   f) a voltage-stabilizing circuit;
   g) a flyback diode; and
   h) a switch;

wherein
- the supercapacitor is connected in parallel to the motor and the transistor switch and the motor and the transistor switch are connected in series;
- a signal output end of the electric signal processor is connected to a trigger electrode of the transistor switch via the output resistor;
- a sampling end of the electric signal processor is connected to a positive pole of the supercapacitor;
- the motor is connected in parallel to the flyback diode;
- a Vcc end of the electric signal processor is connected to the supercapacitor via the voltage-stabilizing circuit; and
- state control ends of the electric signal processor are connected to a GND or Vcc of the electric signal processor via the switch.

4. The power controller of claim 3, wherein the state control ends of the electric signal processor are adjustable in number.

\* \* \* \* \*